(12) United States Patent
Ben-Shalom et al.

(10) Patent No.: US 9,979,749 B2
(45) Date of Patent: *May 22, 2018

(54) NETWORK SECURITY ELEMENTS USING ENDPOINT RESOURCES

(71) Applicant: Intel Corporation, Santa Clara, CA (US)

(72) Inventors: Omer Ben-Shalom, Rishon Le-Tzion (IL); Uri Blumenthal, Fair Lawn, NJ (US)

(73) Assignee: INTEL CORPORATION, Santa Clara, CA (US)

(*) Notice: Subject to any disclaimer, the term of this patent is extended or adjusted under 35 U.S.C. 154(b) by 435 days.

This patent is subject to a terminal disclaimer.

(21) Appl. No.: 14/613,334

(22) Filed: Feb. 3, 2015

(65) Prior Publication Data

US 2015/0244739 A1 Aug. 27, 2015

Related U.S. Application Data

(63) Continuation of application No. 11/647,860, filed on Dec. 29, 2006, now Pat. No. 8,949,986.

(51) Int. Cl.
*H04L 29/06* (2006.01)

(52) U.S. Cl.
CPC .......... *H04L 63/1491* (2013.01); *H04L 63/10* (2013.01); *H04L 63/1441* (2013.01)

(58) Field of Classification Search
None
See application file for complete search history.

(56) References Cited

U.S. PATENT DOCUMENTS

| | | |
|---|---|---|
| 6,775,657 B1 | 8/2004 | Baker |
| 6,907,533 B2 | 6/2005 | Sorkin et al. |
| 6,981,155 B1 | 12/2005 | Lyle et al. |
| 7,042,852 B2 | 5/2006 | Hrastar |
| 7,058,796 B2 | 6/2006 | Lynn et al. |
| 7,706,253 B1 | 4/2010 | Pampati et al. |
| 2004/0111636 A1 | 6/2004 | Baffes et al. |
| 2004/0128529 A1 | 7/2004 | Blake et al. |
| 2004/0128543 A1 | 7/2004 | Blake et al. |
| 2004/0172557 A1 | 9/2004 | Nakae et al. |
| 2005/0050353 A1 | 3/2005 | Thiele et al. |
| 2005/0108568 A1 | 5/2005 | Bussiere et al. |
| 2005/0210534 A1 | 9/2005 | Krishnamurthy |

(Continued)

FOREIGN PATENT DOCUMENTS

| | | |
|---|---|---|
| JP | 2003-036243 | 7/2003 |
| JP | 2006-099590 | 4/2006 |
| WO | WO-2006113781 | 10/2006 |

OTHER PUBLICATIONS

Non-Final Office Action for U.S. Appl. No. 11/647,860 dated Jun. 17, 2010, 14 pages.

(Continued)

*Primary Examiner* — Nadia Khoshnoodi
(74) *Attorney, Agent, or Firm* — Womble Bond Dickinson (US) LLP

(57) ABSTRACT

A method and apparatus for network security elements using endpoint resources. An embodiment of a method includes receiving a request for access to a network at an endpoint server. The method further includes detecting that the request for access to the network includes a request that is unauthorized. The request for access to the network is directed to a network security element.

18 Claims, 5 Drawing Sheets

(56) References Cited

U.S. PATENT DOCUMENTS

| | | |
|---|---|---|
| 2005/0276275 A1 | 12/2005 | Sabry et al. |
| 2006/0075135 A1 | 4/2006 | Rambhia |
| 2006/0101515 A1 | 5/2006 | Amoroso et al. |
| 2006/0107321 A1 | 5/2006 | Tzadikario |
| 2006/0161982 A1 | 7/2006 | Chari et al. |
| 2006/0179485 A1 | 8/2006 | Longsine et al. |
| 2006/0212942 A1 | 9/2006 | Barford et al. |
| 2006/0242701 A1 | 10/2006 | Black et al. |
| 2006/0242704 A1 | 10/2006 | Aviani et al. |
| 2007/0005963 A1 | 1/2007 | Eldar et al. |
| 2007/0005985 A1 | 1/2007 | Eldar et al. |
| 2007/0011676 A1 | 1/2007 | Sahita et al. |
| 2007/0067841 A1 | 3/2007 | Yegneswaran et al. |
| 2008/0134321 A1 | 6/2008 | Rajagopal et al. |

OTHER PUBLICATIONS

Final Office Action for U.S. Appl. No. 11/647,860 dated Apr. 11, 2011, 14 pages.

Notice of Allowance in U.S. Appl. No. 11/647,860 dated Oct. 9, 2014, 7 pages.

Notice of Allowance (+English Translation) in Chinese Application No. 200710305278.X dated Aug. 5, 2013, 4 pages.

Decision to Grant in European Application No. 07255031.2 dated Jun. 27, 2013, 1 page.

JPO, Office Action for Japanese Patent Application No. 2007-334351 dated May 18, 2010.

SIPO, Office Action for chinese Patent Application No. 200710305278.X dated Apr. 29, 2010.

KIPO, Notice of Preliminary Rejection for Korean Patent Application No. 10-2007-140966 dated Oct. 29, 2009.

KIPO, Notice of Final Rejection for Korean Patent Application No. 10-2007-140966 dated Jul. 29, 2010.

JPO, Final Office Action for Japanese Patent Application No. 2007-334351 dated Sep. 14, 2010.

Second Office Action from CN200710305278.X dated Dec. 5, 2011, 21 pgs.

Examiner's Decision of Refusal dated Jan. 7, 2014 (+ English translation), in Japanese Patent Application No. 2011-116659, 4 pages.

"Learn How Darknets Can Serve as an Early Warning System for Network Threats", (Nov. 18, 2005), 2 pages.

Office Action dated Dec. 5, 2012 (+ English translation), in Chinese Patent Application No. 200710305278.X, 7 pages.

Office Action dated Mar. 27, 2013 (+ English translation), in Chinese Patent Application No. 200710305278.X, 7 pages.

Office Action from EP07255031.2 dated Sep. 12, 2011, 4 pages.

Office Action dated Aug. 2, 2012 (+ English translation), in Chinese Patent Application No. 200710305278.X, 8 pages.

Official Action dated Aug. 6, 2013 (+ English translation), in Japanese Patent Application No. 2011-116659, 13 pages.

Shuji Ikeda, Message from Venders 01, "Network threat control using a honey pot, Create a honey net with Recourse ManTrap Ver. 2.1," Software Design, Japan, Gijutsu-Hyohron Co., Ltd., Nov. 18, 2001, No. 133, pp. 204-207.

D'Amico, Adam , "Strategies for Achieving Network Intelligence", (Jun. 8, 2005), 14 pages.

EPO, 42P24715EP OA dated Oct. 1, 2008 for EP Application 07255031.2-2413, (dated Oct. 1, 2008).

Holz, Thorsten , "Learning More About Attack Patterns with Honeypots", (2006), 25 pages.

Ihara, Hideaki , "Tender trap of decoy servers, the largest-ever honeypot strategy! Perfect trends and countermeasures, 3. Defind log duplexing at all cost", Network World, vol. 8, No. 10, Windows Server World, supplement, IDG Japan, Inc., (Oct. 1, 2003), 96-99.

Ishikawa, Satoshi , et al., "Centralized Control of Honeypot System by using Virtual Networks", Sixth Workshop on Internet, WIT2004.

Jiang, Xuxian , et al., "Collapsar: A VM-based honeyfarm and reverse honeyfarm architecture for network attack capture and detention", www.sciencedirect.com, J. Parallel Distrib. Comput. 66, Cerias and Department of Computer Science, Purdue University, West Lafayette, IN, (Dec. 17, 2005), 1165-1180.

Kuwatly, Iyad , et al., "A Dynamic Honeypot Design for Intrusion Detection", Proceedings of the IEEE/ACS International Conference on Pervasive Services (ICPS'04), (Jul. 19, 2004), 95-104.

Mniohara, Takashi , et al., "Centralized Surveillance of Unused Address Space by using Virtual Networks", Dependable Computing, 2005, Proceedings 11th Pacific Rim International Symposium, (Dec. 12-14, 2005).

Qin, Xinzhou , et al., "Worm Detection Using Local Networks", Technical report, College of Computing, Georgia Tech, (Feb. 2004), pp. 1-18.

Shirahata, Shin , et al., "Development of Network-based Honeypot Using Policy Routing", IPSJ Technical Report, vol. 2005, No. 83, 2004-DSM-38-11, Information Processing Society of Japan, (Aug. 15, 2005), 55-58.

Rajagopal, Priya , et al., "Tamper-Resistant Method and Apparatus for Verification and Measurement of Host Agent Dynamic Data Updates", U.S. Appl. No. 11/648,252, filed Dec. 29, 2006.

NETWORK SECURITY ELEMENTS USING ENDPOINT RESOURCES

CROSS-REFERENCE TO RELATED APPLICATION

This application is a continuation of U.S. patent application Ser. No. 11/647,860 filed Dec. 29, 2006, now U.S. Pat. No. 8,949,986 issued Feb. 3, 2015, which application is incorporated herein by reference in its entirety.

FIELD

Embodiments of the invention relate to computer security. More particularly, embodiments of the invention relate to network security elements using endpoint resources.

BACKGROUND

For computer operations, numerous network security elements have been introduced in order to combat attacks by outside persons. For example, unauthorized persons often attempt to access network resources by probing the network for accessible points in the system.

Among the network security elements that have been devised to address unauthorized network entry are darknet analyzers and honeypots, which combine to lure harmful traffic away from operational computer resources and to allow system personnel to analyze the attackers. In general, the security elements will recognize that an unauthorized person is attempting to access IP (Internet Protocol) addresses that are on unused subnets, and thus should not be accessed. Once the access is detected, the unauthorized user may be directed to a server or system that is separate from the operational network, and which may be referred to as a "darknet". In addition, the network security may attempt to emulate the system to try to encourage the unauthorized user to divulge the user's access methods or level of knowledge regarding the network (referred to as a "honeypot"), thereby enabling system administrators to improve network security.

However, conventional systems are limited in operation, and will not protect the network in many cases. If an unauthorized user has sufficient knowledge the user may be able to avoid triggering the darknet operation. For example, if the user is able to avoid unassigned IP addresses or unused networks the user may not be detected. In addition, the operation of the darknet/honeypot might be detected by the unauthorized user, allowing the user to break off contact before network administrators are able to gain information regarding the intruder.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1:
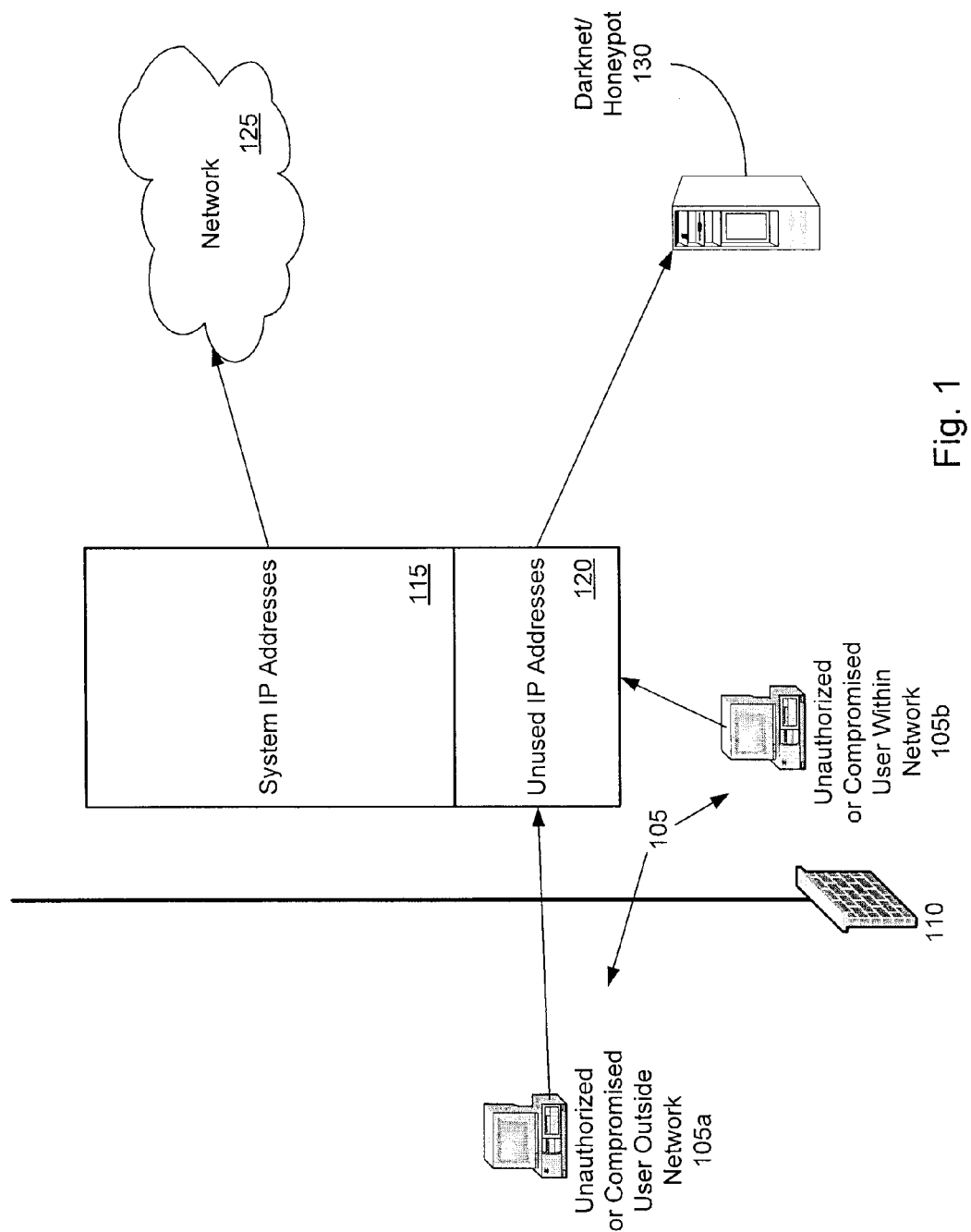
FIG. 1 is an illustration of the use of network security elements for detection and prevention of unauthorized entry into the network.

An embodiment of the invention concerns network security elements using endpoint resources.

As used herein:

"Darknet" means a network server or element that is utilized to direct unauthorized usage away from operational network elements. In a common example users who attempt to access unassigned IP addresses in unused subnets may be detected and directed to the darknet.

"Honeypot" means a network element that is utilized to emulate network access to an unauthorized user. In an example, a party accessing a network who is suspected of being unauthorized may be directed to a honeypot in order to gain information regarding the unauthorized access attempt.

"Network security element" means an element that is intended to protect a network from unauthorized access. The term "network security element" includes, but is not limited to, a darknet or a honeypot.

In an embodiment of the invention, network security elements to protect against unauthorized users are distributed through a network. In an embodiment of the invention, the operation of network security is expanded through use of distributed network security elements in network endpoints. In an example, the types of authorized access that are directed to a darknet/honeypot are expanded through distribution of functions to network endpoints. In an embodiment of the invention, network security elements analyze traffic at levels that may be accessed by endpoint resources, rather than being limited to conventional operations.

Network security elements such as darknets and honeypots are highly useful tools in the security arsenal of enterprises. These security elements normally exist in a central location and have visibility into certain parts of the enterprise IP space, normally by the diversion of traffic that is destined to IP addresses in unused subnets. However, a significant problem with this approach is that it does not provide any visibility into many occurrences, with traffic that is destined to used IP addresses or to unused IP addresses in used networks escaping the security elements. Conventional constructs are thus less useful in addressing knowledgeable or skillful attackers. Attackers who have knowledge of the IP space allocation, such as attackers who monitor network traffic prior to probing or have other topological knowledge, are able to partly or totally avoid these detection systems, and thus the security elements will not have any visibility of attackers who are able to limit access to assigned IP addresses or addresses in active networks.

In an embodiment of the invention, network security is distributed through the network such that endpoint resources may be utilized for security. The use of endpoint resources allow visibility in more operations by providing finer granularity in traffic that is directed to the darknet, and to allow emulation of operations at the endpoint level, thereby improving the quality of emulation. The distribution of darknet operations can operate to both make the security system harder to avoid (because active addresses are included within the scope of the system) and make the security system harder to detect (because the endpoint systems are capable of more closely approximating the operation of an operational system). In one example, an endpoint is capable of providing the same TTL (Time to Live—a value in an IP packet that tells a router whether or not the packet has been in the network too long and should be discarded) for a packet as a normal system, thus providing a response that is not available from a remote darknet because of the remote system's requisite delay in packet transmissions.

In an embodiment of the invention, a network includes one or more emulations of servers, theses elements being emulated by real host systems. For example, a network router may provide access to one or more real host systems and one or more emulated systems, as emulated by the real systems. The emulated systems are intended to appear to be a part of the operational system, but actually are emulations at the endpoint level.

In an embodiment of the invention, distribution of network security may be implemented in a network without the investment of significant resources. For example, only a relatively small amount of endpoint resources in the ME (management engine) is required for distribution of network security operation. Further, no host OS (operation system) involvement is required, thus making the distributed security elements simple to deploy and use. In an embodiment of the invention, OS involvement is not required because all the network traffic passes through the ME, and thus security countermeasures can be taken before the OS even has a chance to see the malicious packet. Thus, the OS is not exposed, and the intrusion attempt handling is kept completely within the ME device.

In an embodiment of the invention, the endpoint shells (the emulations of servers provided for security) operate to send certain types of traffic that appear to be unauthorized (which may also be referred to as any traffic that is defined as "interesting") or statistics regarding such traffic, to a central security server (a DarkNet/Honeypot server). The use of the distributed security elements may be used to increase the visibility of such constructs into operations. In an embodiment, the distributed network security elements may be utilized to avoid a major downfall of convention operations, which is the selective view of the network space that is usually provided by darknet/honeypot servers.

In a particular embodiment of invention, resources of, for example, the Intel Active Management Technology (iAMT) ME (management engine), manufactured by Intel Corporation, may be utilized to selectively detect certain traffic types or create certain statistics and pass those on to a central DarkNet/Honeypot. However embodiments of the invention are not limited to this environment. In an embodiment, the agent that is used to classify the "interesting" network traffic may be a circuit breaker (CB), a circuit breaker being an element that is "tripped" when a certain kind of signal or data is received. In an embodiment of the invention, an extension of the ME may be utilized to either perform honeypot-type actions, or may be utilized to replicate certain traffic types passing through it to a remote analyzer. In an example, if a server receives a SYN request, indicating a request to establish a TCP (Transport Control Protocol) connection, but the traffic is destined to a closed port, the server would normally send a RST (Reset) response. In an embodiment of the invention, the ME of the server may be configured to send a SYNACK (or SYN/ACK) (acknowledgement and synchronization in response to a SYN sent to the server) response instead of an RST response when traffic is destined to closed ports, and then send the following packet or packets to a darknet/honeypot server.

In an embodiment of the invention, the operation of a network security element established in an endpoint agent includes the diversion of detected unauthorized network traffic. The methods used for such diversion may vary in different implementations, and may include, but are not limited to, the following:

(1) Opening an IP tunnel to forward the unauthorized traffic. An IP tunnel may be established using various means, including, for example, IP-in-IP tunnels (generally used to forward information between endpoints, acting as a bridge between portions of an IP internetwork that have differing capabilities; as provided in "IP in IP Tunneling", Internet Network Working Group RFC 1853, October 1995; see also "IP Encapsulation Within IP", Internet Network Working Group RFC 2003, October 1996); or other similar methods.

(2) Marking the traffic with a known DSCP (Differentiated Services Code Point, which designates a field that is provided in the header of an IP packet for the purpose of packet classification) value. In this example, the network infrastructure is allowed to employ policy based routing methods to pass the designated information to the DarkNet.

In an embodiment of the invention, an endpoint agent may, depending on the particular implementation, pass to a central darknet/honeypot controller all packets matching the designated criteria; certain packets, such as a statistical sampling of such traffic; or only statistics about such traffic. If a large number of stations take part in a distributed endpoint security solution, then even a sparse statistical sampling of network traffic may provide sufficient visibility into what is happening in the network environment to allow a network administrator to analyze the situation.

In a particular embodiment of the invention, a network can utilize existing endpoints, such as endpoints supporting iAMT, as enterprise security analysis entities without knowledge of or participation by the host OS. This structure is desirable because it does not complicate the endpoint configuration, and it minimizes the impact on performance. In addition, an embodiment of a distributed security structure is directly controlled by the administration bodies, rather than by the station administrator. Using controlled entities outside of the host OS simplifies the process of integrating the entities into the overall enterprise of the ISP security sensor network, and may act to close significant gaps in the visibility of malware activities. With the expected continuation evolution of malware, this capability may be significant in achieving defense in depth. Further, providing a security entity outside of the OS may be utilized to prevent malware from tampering with the OS.

In an embodiment of the invention, a process is provided to enhance the darknet and honeypot functionality and operates to prevent the ability of topologically aware malware to escape scrutiny. In an embodiment of the invention, a system allows the use of every host within a domain as a honeypot.

FIG. 1 is an illustration of the use of network security elements for detection and/or prevention of unauthorized or malicious traffic entry into the network. In this illustration, an unauthorized or compromised user 105 is either attempting to enter a network (user outside network 105*a*), which may be protected by various security agents and devices, including, for example, a firewall 110, or is already a legal user in such a network (user inside network 105*b*). If the user 105 is able to circumvent other security measures, the user may attempt to access or create an attack on one or more IP addresses on the system. In addition to system IP addresses 115 that may be part of or provide access to the operational network 125, there may also be certain unused IP addresses 120 that should not normally be accessed. The attempt by the user 105 to access an unused IP address may result in the activity being detected and/or redirection of the traffic to a darknet/honeypot server that may emulate the operational network in order to induce the unauthorized user to divulge information about the user's methods or intentions. In addition, other network elements may be utilized to limit access by a user, which may be based on information that is derived in the darknet.

However, the unauthorized user may have gained knowledge regarding IP address allocation, and thus may avoid accessing unused IP spaces as above and therefore avoid being detected or redirected to the darknet 130. Further, even if the user 105 is directed to the darknet, the operation of the darknet may betray its actual function. In particular, the delay in obtaining response from a central darknet server, as opposed to the local system that the user 105 was attempting to reach, may result in the user becoming aware of the situation. If the user 105 is thus forewarned, the user may then try different tactics to avoid detection.

In an embodiment of the invention, the function of the darknet/honeypot server 130 is assisted through the use of endpoint operations. In an embodiment of the invention, the darknet and honeypot operations utilize localized endpoint functions to implement an improved security process.

Figure 2:
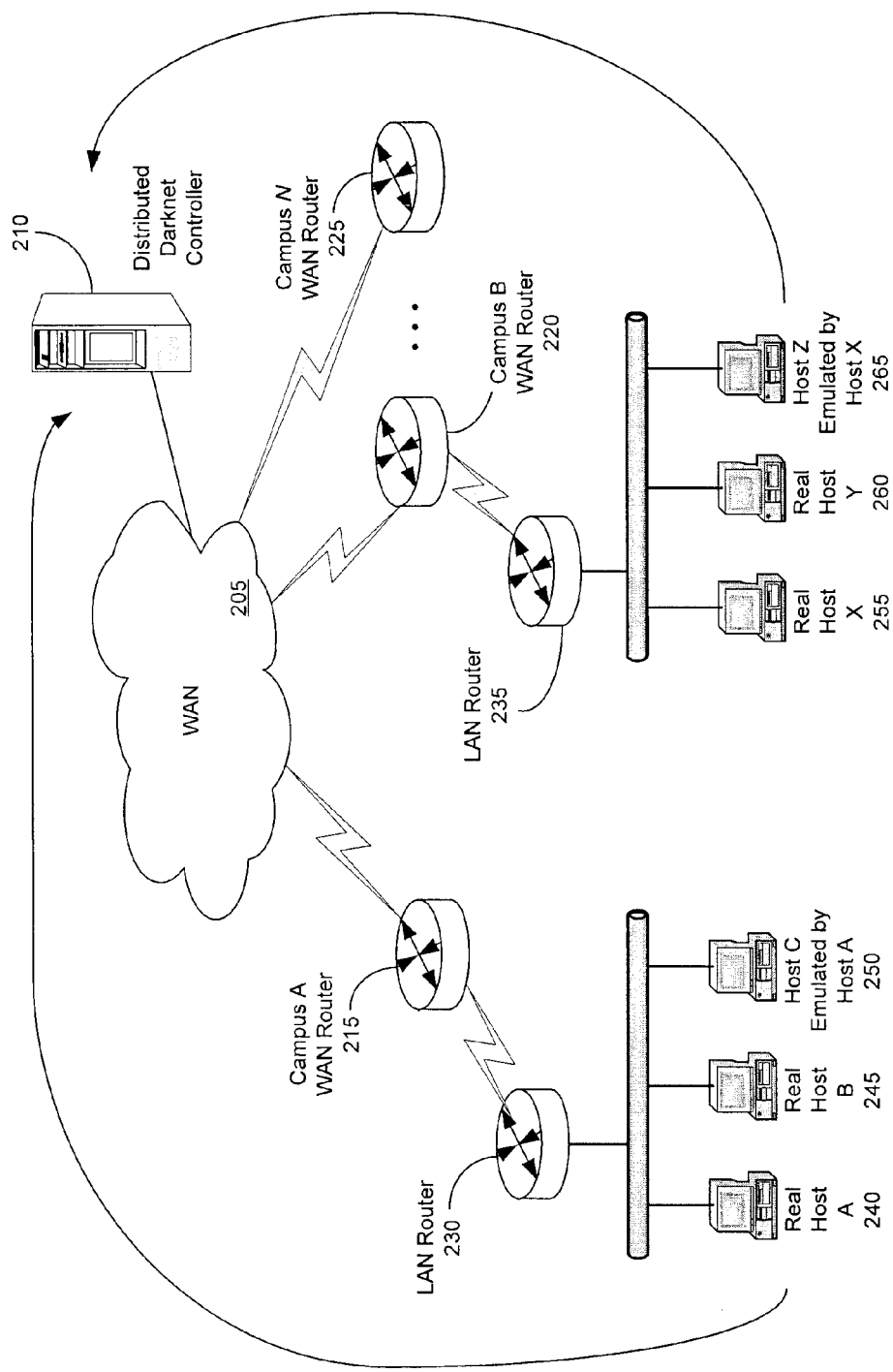
FIG. 2 is an embodiment of a distributed network security system.

FIG. 2 is an embodiment of a distributed network security system. The system illustrated in FIG. 2 is simply an example of a possible network structure, and embodiments of the invention are not limited to any particular network structure. In this illustration, a wide area network (WAN) 205 includes a distributed darknet controller 210. The darknet controller 210 acts as a controller for distributed security elements, which are implemented at endpoints of the network. The WAN 205 may include multiple routers for campuses, including campus A WAN router 215, campus B WAN router 220, and continuing through campus N WAN router 225. Campus A WAN router 215 may transmit data to a local area network (LAN) router 230, with the local area network including a real host A 240, a real host B 245, and a host C 250 that is actually emulated by host A 240. Similarly, campus B WAN router 220 may transmit data to a local area network (LAN) router 235, with the local area network including a real host X 255, a real host Y 260, and a host Z 265 that is actually emulated by host X 255.

In an embodiment of the invention, the darknet operations of the network are governed by the distributed darknet controller 210, and are distributed to emulated network host elements, host C 250 and host Z 265. In an embodiment of the invention, increased visibility into improper network requests is provided both through the emulated hosts and the real host systems. Attempts to direct traffic to virtual hosts C 250 and Z 265 will be forwarded or reported to the darknet controller 210. In addition, any traffic that is destined to unused ports on real hosts A, B, X, and Y may also be forwarded or reported to the darknet controller 210. The redirected traffic transfer may be provided by IP tunneling, by marking the traffic with a known DSCP, or by another method. In addition, the host servers can also intercept any RST specifying that a port is closed and send a SYNACK instead in order to see what connection attempt is made, and may tunnel the request to the distributed honeypot operation of the controller 210 to discern information regarding the attempted unauthorized access.

Figure 3:
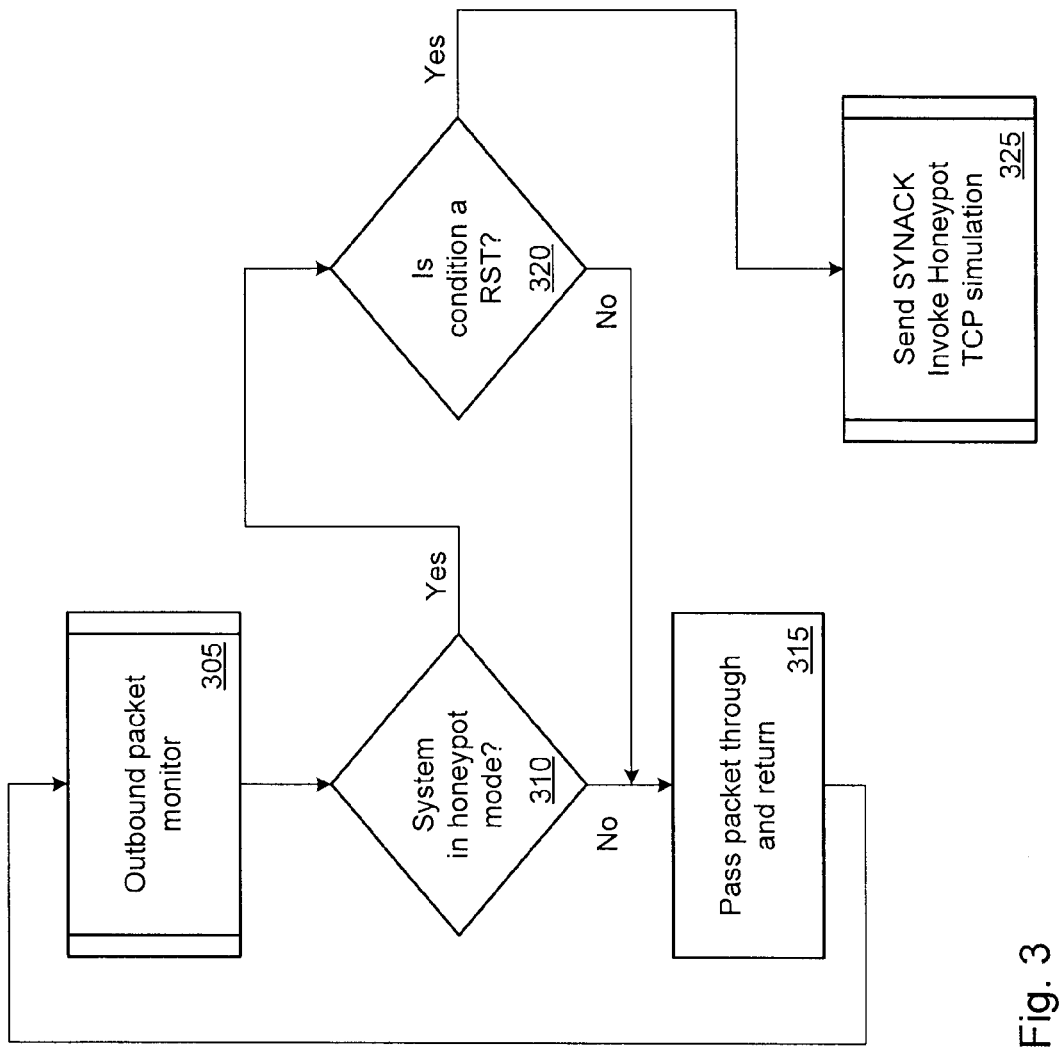
FIG. 3 is an illustration of a process for an outbound packet monitor.

FIG. 3 is an illustration of a process for an outbound packet monitor. In this illustration, upon the establishment of the outbound packet monitor process 305 there is a determination whether the system is in a honeypot mode 310, a mode in which there are honeypot operations for unauthorized requests. If not, the packet may then be passed through and the process returns 315. If the honeypot mode is active, then there is a determination whether a RST condition is present 320. If not, the packet can be passed through and the process returns 315. If there is a RST condition, then a SYNACK is sent instead 325 in an attempt to induce an unauthorized user to divulge more information. The process further includes invoking a honeypot TCP simulation to convince the unauthorized user that a TCP session is being established.

Figure 4:
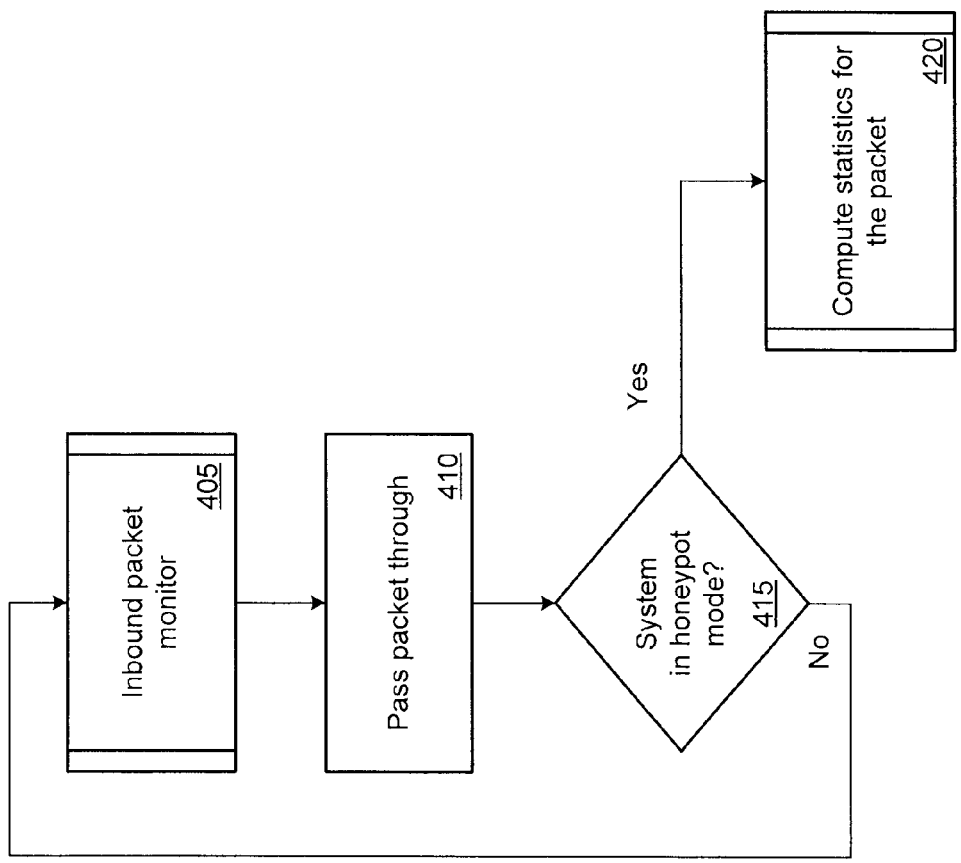
FIG. 4 is an illustration of a process for an inbound packet monitor.

FIG. 4 is an illustration of a process for an inbound packet monitor. In an embodiment of the invention, upon the establishment of the inbound packet monitor process 405, the inbound packet from an unauthorized user is passed through 410. There is then a determination whether the system is in the honeypot mode 415. If not, the process continues until another packet is received. If the system is in the honeypot mode then statistics regarding the packet are computed 420, which can then be used in analyzing unauthorized network traffic.

Figure 5:
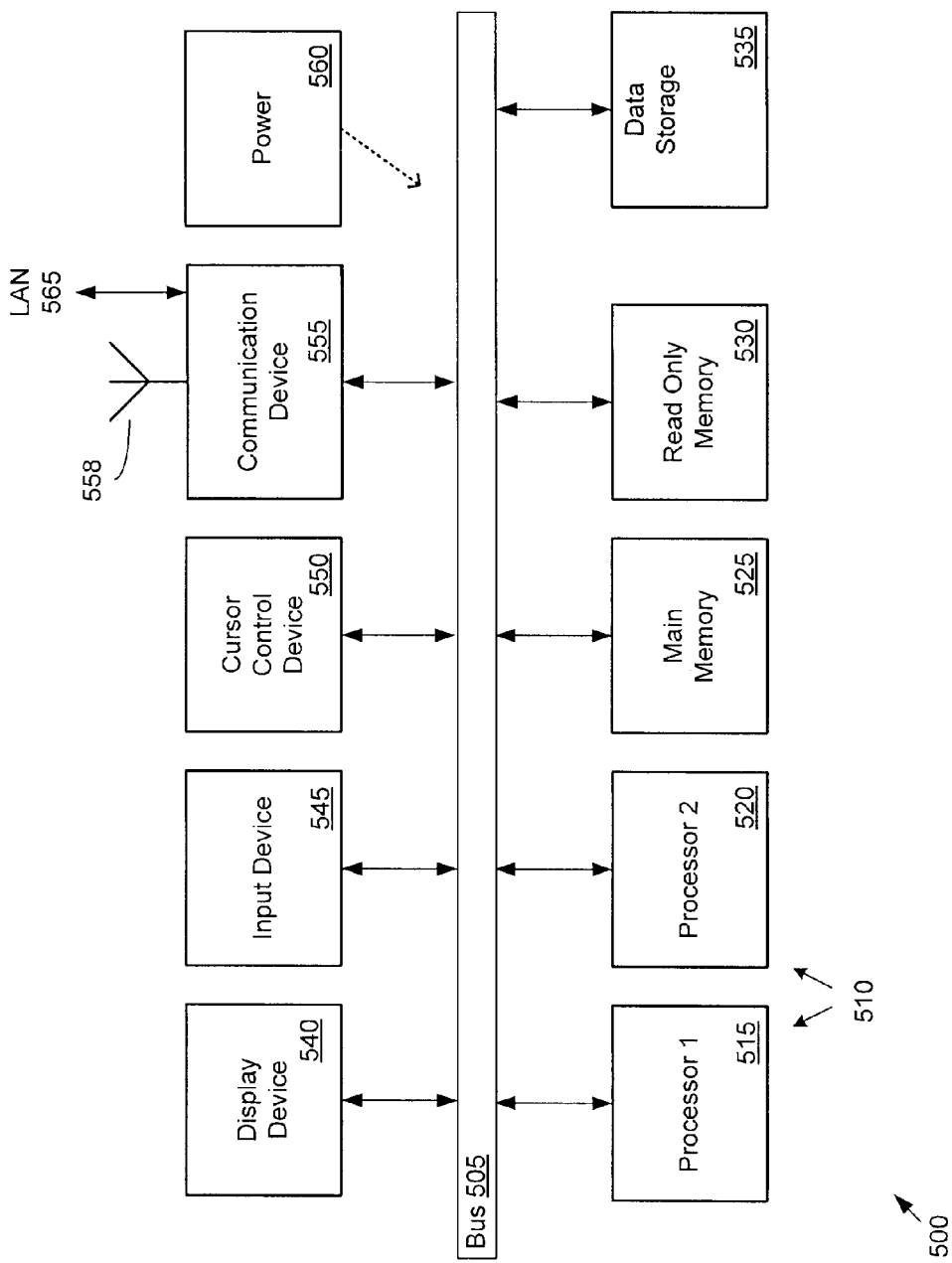
FIG. 5 is an illustration of a computer system utilizing an embodiment of the invention.

FIG. 5 is an illustration of a computer system utilizing an embodiment of the invention. The computer system may represent an endpoint server for a server in an embodiment, the endpoint server being used in the distributed darknet/honeypot operation of the network. Certain standard and well-known components that are not germane to the present invention are not shown. Under an embodiment of the invention, a computer 500 comprises a bus 505 or other communication means for communicating information, and a processing means such as two or more processors 510 (shown as a first processor 515 and a second processor 520) coupled with the bus 505 for processing information. The processors 510 may comprise one or more physical processors and one or more logical processors. Further, each of the processors 510 may include multiple processor cores. The computer 500 is illustrated with a single bus 505 for simplicity, but the computer may have multiple different buses and the component connections to such buses may vary. The bus 505 shown in FIG. 5 is an abstraction that represents any one or more separate physical buses, point-to-point connections, or both connected by appropriate bridges, adapters, or controllers. The bus 505, therefore, may include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, sometimes referred to as "Firewire". ("Standard for a High Performance Serial Bus" 1394-1995, IEEE, published Aug. 30, 1996, and supplements)

The computer 500 further comprises a random access memory (RAM) or other dynamic storage device as a main memory 525 for storing information and instructions to be executed by the processors 510. Main memory 525 also may be used for storing temporary variables or other intermediate information during execution of instructions by the processors 510. RAM memory includes dynamic random access memory (DRAM), which requires refreshing of memory contents, and static random access memory (SRAM), which does not require refreshing contents, but at increased cost. DRAM memory may include synchronous dynamic random access memory (SDRAM), which includes a clock signal to control signals, and extended data-out dynamic random access memory (EDO DRAM). The uses of the main memory may include the storage received signals from wireless devices. The computer 500 also may comprise a read only memory (ROM) 530 and/or other static storage devices for storing static information and instructions for the processors 510.

Data storage 535 may also be coupled to the bus 505 of the computer 500 for storing information and instructions. The data storage 535 may include a magnetic disk or optical disc and its corresponding drive, flash memory or other nonvolatile memory, or other memory device. Such elements may be combined together or may be separate components, and utilize parts of other elements of the computer 500.

The computer 500 may also be coupled via the bus 505 to a display device 540, such as a cathode ray tube (CRT) display, a liquid crystal display (LCD), a plasma display, or any other display technology, for displaying information to an end user. In some environments, the display device may be a touch-screen that is also utilized as at least a part of an input device. In some environments, display device 540 may be or may include an audio device, such as a speaker for providing audio information. An input device 545 may be coupled to the bus 505 for communicating information and/or command selections to the processors 510. In various implementations, input device 545 may be a keyboard, a keypad, a touch-screen and stylus, a voice-activated system, or other input device, or combinations of such devices. Another type of user input device that may be included is a cursor control device 550, such as a mouse, a trackball, or cursor direction keys for communicating direction information and command selections to the one or more processors 510 and for controlling cursor movement on the display device 540.

A communication device 555 may also be coupled to the bus 505. Depending upon the particular implementation, the communication device 555 may include a transceiver, a wireless modem, a network interface card, LAN (Local Area Network) on motherboard, or other interface device. The uses of a communication device 555 may include reception of signals from wireless devices. For radio communications, the communication device 555 may include one or more antennas 558. In one embodiment, the communication device 555 may include a firewall to protect the computer 500 from improper access. The computer 500 may be linked to a network, such as LAN (local area network) 565, or to other devices using the communication device 555, which may include links to the Internet, a local area network, or another environment. The computer 500 may also comprise a power device or system 560, which may comprise a power supply, a battery, a solar cell, a fuel cell, or other system or device for providing or generating power. The power provided by the power device or system 960 may be distributed as required to elements of the computer 500.

In an embodiment of the invention, the computer 500 is an endpoint server containing the capability to act as a part of a distributed network security system. In an embodiment, the processors 510 process incoming data packets, and detect packets that appear to be unauthorized, such as packets that include request for access to unused addresses or port numbers. In an embodiment, the computer forwards some or all of the unauthorized data traffic, or statistics regarding the data traffic, to a centralized darknet controller for purposes of controller security operations and analyzing the detected traffic.

Those skilled in the art having the benefit of this disclosure will appreciate that many other variations from the foregoing description and drawings may be made within the scope of the present invention. Indeed, the invention is not limited to the details described above. Rather, it is the following claims including any amendments thereto that define the scope of the invention.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention may include various processes. The processes of the present invention may be performed by hardware components or may be embodied in machine-executable instructions, which may be used to cause a general-purpose or special-purpose processor or logic circuits programmed with the instructions to perform the processes. Alternatively, the processes may be performed by a combination of hardware and software.

Portions of the present invention may be provided as a computer program product, which may include a machine-readable medium having stored thereon instructions, which may be used to program a computer (or other electronic devices) to perform a process according to the present invention. The machine-readable medium may include, but is not limited to, floppy diskettes, optical disks, CD-ROMs (compact disk read-only memory), and magneto-optical disks, ROMs (read-only memory), RAMs (random access memory), EPROMs (erasable programmable read-only memory), EEPROMs (electrically-erasable programmable read-only memory), magnet or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Many of the methods are described in their most basic form, but processes can be added to or deleted from any of the methods and information can be added or subtracted from any of the described messages without departing from the basic scope of the present invention. It will be apparent to those skilled in the art that further modifications and adaptations can be made. The particular embodiments are not provided to limit the invention but to illustrate it. The scope of the present invention is not to be determined by the specific examples provided above but only by the claims below.

It should also be appreciated that reference throughout this specification to "one embodiment" or "an embodiment" means that a particular feature may be included in the practice of the invention. Similarly, it should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims are hereby expressly incorporated into this description, with each claim standing on its own as a separate embodiment of this invention.

What is claimed is:

1. An endpoint server in a distributed network security system comprising:

one or more processors;
an interface to receive requests for access to the network;
a detection module to detect unauthorized requests for access to the network received at the interface and to transfer the detected unauthorized requests; and
an endpoint network security element including one or more processors, the endpoint security element being a part of the distributed network security system in which each of a plurality of endpoint servers includes a respective endpoint network security element, the endpoint network security element to receive detected unauthorized requests from the detection module, the endpoint network security element to provide an emulation of a server on the network and to generate and transmit a response to a sender of each received unauthorized request acknowledging receipt of the unauthorized request;
wherein the endpoint network security element is to forward detected unauthorized requests or data regarding detected unauthorized requests to a central server for processing, the central security server acting as a controller of the endpoint network security element in the distributed network security system.

2. The endpoint server of claim 1, wherein a first unauthorized request includes a request for an unused element of an active network address.

3. The endpoint server of claim 1, wherein a first unauthorized request comprises a request to establish a TCP (Transport Control Protocol) connection, and wherein the response to the unauthorized request provided to the sender by the endpoint network security element is an acknowledgment and synchronization (SYNACK) response.

4. The endpoint server of claim 1, wherein generating the acknowledgement to an unauthorized request includes determining that a reset condition is present and sending an acknowledgement instead of a reset response.

5. The endpoint server of claim 1, wherein the acknowledgement sent to the sender includes a time to live (TTL) value that is generated by the endpoint network security element.

6. The endpoint server of claim 1, wherein the endpoint network security element operates independently of an operating system of the endpoint server.

7. A central security server for a network comprising:
a network connection to provide connections with a plurality of endpoint servers, each of the plurality of endpoint servers including an endpoint network security element for the distributed network security system; and
a processor for processing of detected unauthorized requests or data regarding detected unauthorized requests received from endpoint network security elements of the distributed network security system;
wherein, the central security server operates as a controller of the endpoint network security element of each of the endpoint servers in the distributed network security system, each of the endpoint network security elements operating to:
provide an emulation of a server on the network and to generate and transmit a response to a sender of each received unauthorized request acknowledging receipt of the unauthorized request, and
forward detected unauthorized requests or data regarding detected unauthorized requests to the central server for processing.

8. The central security server of claim 7, wherein a first unauthorized request includes a request for an unused element of an active network address.

9. The central security server of claim 7, wherein a first unauthorized request detected by a first endpoint server comprises a request to establish a TCP (Transport Control Protocol) connection, and wherein the response to the unauthorized request provided to the sender by the endpoint network security element of the first endpoint server is an acknowledgment and synchronization (SYNACK) response.

10. The central security server of claim 7, wherein the generation of acknowledgement to a request by an endpoint network security element of an endpoint server includes determining that a reset condition is present and sending an acknowledgement instead of a reset response.

11. The central security server of claim 7, wherein the generation of acknowledgement to a request by an endpoint network security element of an endpoint server includes providing a time to live (TTL) value that is generated by the endpoint network security element.

12. The central security server of claim 7, wherein the endpoint network security element operates independently of an operating system of the endpoint server.

13. A non-transitory computer-readable storage medium having stored thereon data representing sequences of instructions that, when executed by a processor, cause the processor to perform operations comprising:
receiving a request from a sender for access to a network at an interface of a first endpoint server in network, the first endpoint server including a first endpoint security element, the first endpoint security element being a part of the distributed network security system in which each of a plurality of endpoint servers includes a respective endpoint network security element;
detecting that the request for access to the network includes a first unauthorized request;
directing the first unauthorized request to the first endpoint network security element, the first endpoint network security element to provide an emulation of a server on the network;
generating at the first endpoint network security element an acknowledgement for the first unauthorized request, and transmitting the acknowledgement from the first endpoint network security element to the sender of the request; and
forwarding detected unauthorized requests or data regarding the detected unauthorized requests from the first endpoint network security element to a central security server for the network, the central security server operating as a controller for operations of the distributed security system.

14. The medium of claim 13, wherein the first unauthorized request includes a request for an unused element of an active network address.

15. The medium of claim 13, wherein the first unauthorized request comprises a request to establish a TCP (Transport Control Protocol) connection, and wherein the response to the unauthorized request provided to the sender by the first endpoint network security element is an acknowledgment and synchronization (SYNACK) response.

16. The medium of claim 13, wherein generating the acknowledgement to the first unauthorized request includes determining that a reset condition is present and sending an acknowledgement instead of a reset response.

17. The medium of claim 13, wherein the acknowledgement sent to the sender of the first unauthorized request includes a time to live (TTL) value that is generated by the endpoint network security element of the first endpoint server.

18. The medium of claim 13, wherein the first endpoint network security element of the first endpoint server operates independently of an operating system of the endpoint server.

* * * * *